United States Patent [19]

Matsui et al.

[11] Patent Number: 4,923,153
[45] Date of Patent: May 8, 1990

[54] STRIP CLAMP

[75] Inventors: Kazuhiro Matsui, Toyoake; Fuminori Ito, Nagoya, both of Japan

[73] Assignee: Kitagawa Industries Co., Ltd., Japan

[21] Appl. No.: 299,411

[22] Filed: Jan. 23, 1989

[30] Foreign Application Priority Data

Feb. 16, 1988 [JP] Japan ............... 63-18871[U]

[51] Int. Cl.$^5$ .................. F16L 3/08; B77D 77/10
[52] U.S. Cl. ................. 248/74.1; 248/316.5; 24/30.5 P; 24/178
[58] Field of Search ............ 248/74.1, 74.4, 316.5, 248/316.6; 24/30.5 P, 30.5 R, 178, 191

[56] References Cited

U.S. PATENT DOCUMENTS

| 2,818,871 | 5/1989 | Beaudry | 24/30.5 P |
| 4,221,352 | 9/1980 | Caveney | 248/74.3 |
| 4,275,485 | 6/1981 | Hutchinson | 24/30.5 R |
| 4,296,529 | 10/1981 | Brown | 24/30.5 P |
| 4,656,697 | 4/1987 | Nöslund | 24/30.5 P |
| 4,770,377 | 9/1988 | Callaway | 248/74.4 X |

FOREIGN PATENT DOCUMENTS

| 273781 | 9/1959 | Italy | 24/30.5 R |
| 1587609 | 4/1981 | United Kingdom | 24/30.5 R |

Primary Examiner—Reinaldo P. Machado
Attorney, Agent, or Firm—Oliff & Berridge

[57] ABSTRACT

A clamp for holding a strip, e.g. a flat cable, securely on a mounting surface includes an overlapping top plate, stepped ridges, and resilient flaps tightly holding the strip in place within the clamp. This design makes the clamp less likely to inadvertently work itself loose from a mounting surface to which it is adhesively secured.

14 Claims, 5 Drawing Sheets

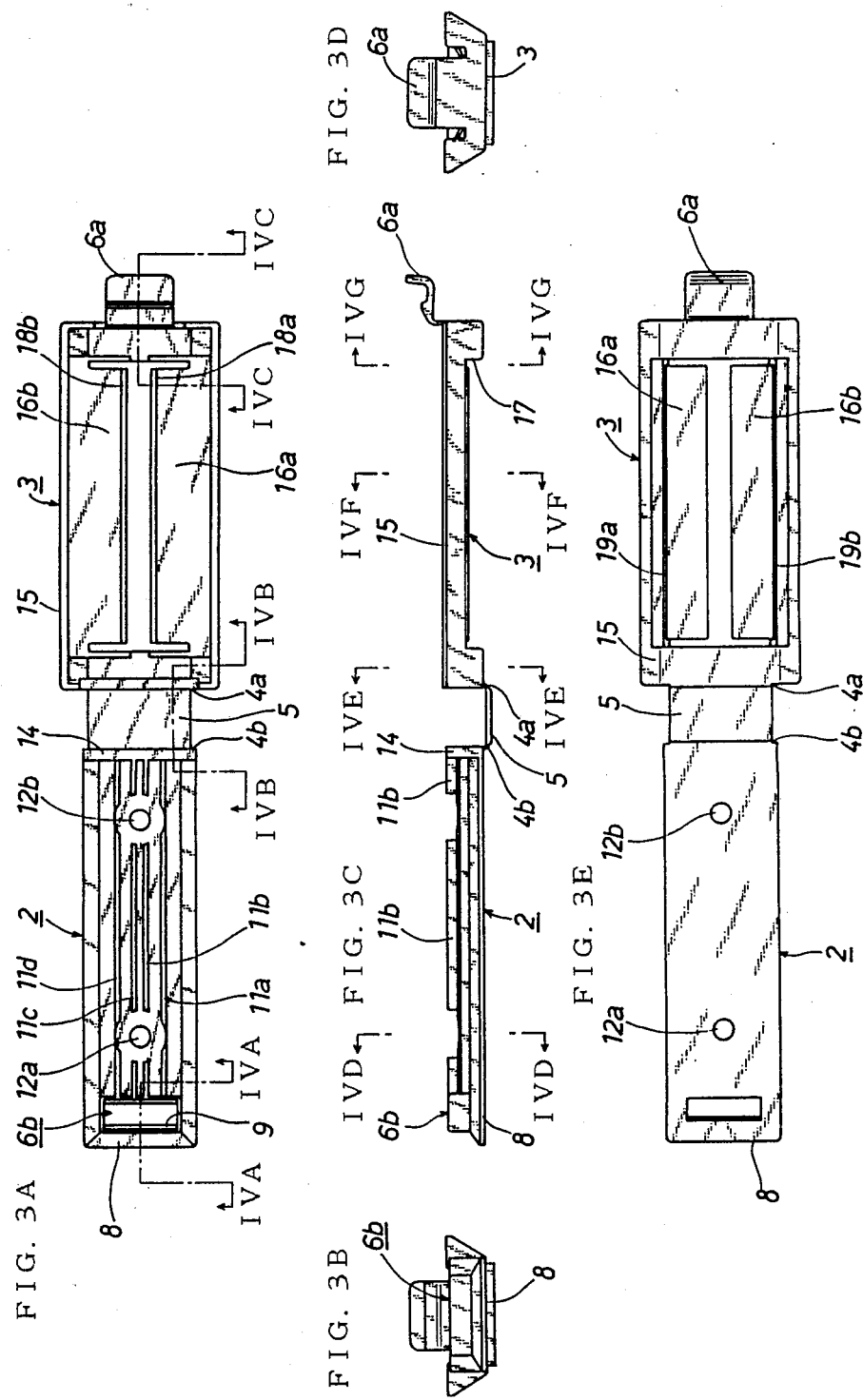

STRIP CLAMP

BACKGROUND OF THE INVENTION

This device secures a strip, e.g. a flat cable, on a mounting surface. The strip clamp has a top plate that overlaps and locks onto a base plate.

One such prior-art device is shown in U.S. Pat. No. 4,221,352. That device has a base plate and an overlapping top plate for pressing the strip onto the base plate. The base plate and top plate are molded as a single piece connected by a hinge. Several narrow ribs transversely cross the base plate. Resilient flaps extend downward from both sides of the top plate toward with the base plate to hold the cable in place. The device may be mounted using fasteners or adhesives.

Unfortunately, that device presents a Catch-22. To secure the flat cable in place, the flaps must be very stiff; but the downward pressure of stiff flaps causes the cable to exert upward pressure against the clamp that tends to separate the clamp from its mounting, especially when it is mounted with adhesives. Making the flaps more supple defeats the purpose of the clamp since the cable could then slip more easily.

SUMMARY OF THE INVENTION

This invention secures a strip to a mounting surface without the strip slipping in the clamp or the clamp separating from the mounting surface. This clamp has a base plate and a top plate formed as a single piece. The top plate overlaps and locks into the base plate.

Two resilient flaps inside the frame of the top plate run the length of the strip. The flaps extend inwardly toward the center of the clamp. Edges along the entire length of the flaps project toward the base plate. Ribs rise from the base plate on both sides of where each flap edge descends. The flaps press the strip into the base plate.

In such a strip clamp, the strip is placed on the base plate, the top plate is closed and locked onto the base plate, and the flaps on the top plate secure the strip in position against the ribs on the base plate. When the top plate locks into the base plate, the ends of the flaps are positioned between the ribs of the base plate. The tops of the ribs hold the strip securely in the clamp between the top plate and the base plate.

BRIEF DESCRIPTION OF THE DRAWINGS

FIG. 3A is a top plan view of the open strip clamp.

FIG. 3B is a slot-end view of FIG. 3A.

FIG. 3C is a side view of FIG. 3A.

FIG. 3D is a latch-end view of FIG. 3A.

FIG. 3E is a bottom plan view of FIG. 3A.

DESCRIPTION OF THE PREFERRED EMBODIMENTS

Figure 1:
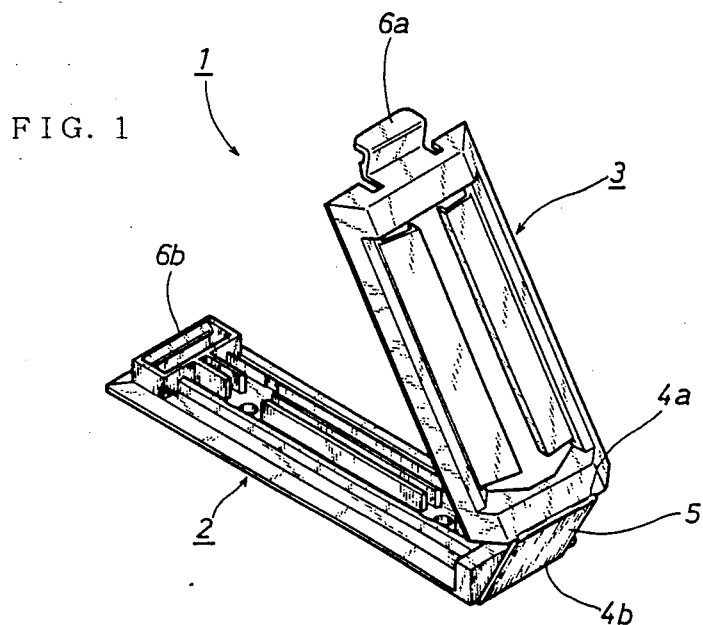
FIG. 1 is a perspective view of one embodiment of this strip clamp.
Figure 2A:
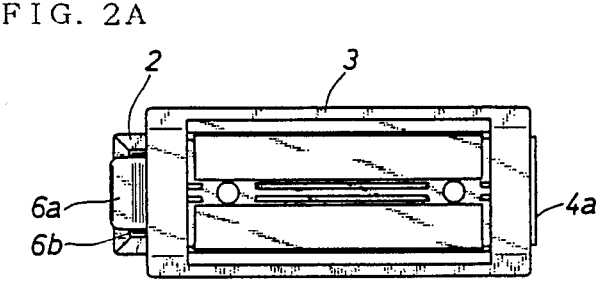
FIG. 2A is a top plan view of the closed strip clamp.
Figure 2B:
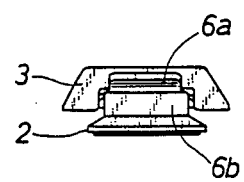
FIG. 2B is a latch-end view of FIG. 2A.
Figure 2C:
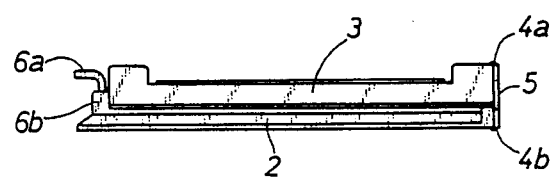
FIG. 2C is a side view of FIG. 2A.

A strip clamp 1, shown in FIG. 1, has a base plate 2 and a top plate 3 that clamp around a strip, like a flat cable, (not shown). The strip clamp 1 is formed as a single piece from synthetic resin. The base plate 2 and the top plate 3 are joined by a joint 5 with two hinges 4a and 4b. A latch 6a snaps into a slot 6b to lock the top plate 3 on the base plate 2.

As shown in FIGS. 3A–E, the base plate 2 has a base frame 8. The base frame 8 has ribs 11a, 11b, 11c and 11d on its top side that run from the slot 6b into a butt plate 14. The joint 5 abuts against the butt plate 14 when the clamp is closed. The base frame 8 has two holes 12a and 12b, for fasteners like such as screws.

The top plate 3 also has a top frame 15 with edges 19a and 19b and end pieces 17 joined together. Resilient flaps 16a and 16b project toward each other from the edges 19a and 19b (respectively). The flaps 16a and 16b of the top plate 3 secure the strip against the base plate 2.

Figure 4A:
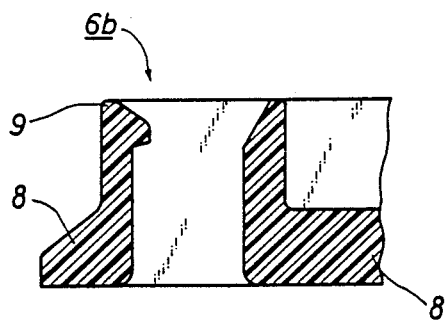
FIG. 4A is a partial sectional view along IVA—IVA in FIG. 3A.
Figure 4B:
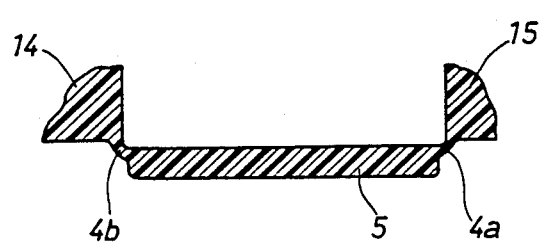
FIG. 4B is a partial sectional view along IVB—IVB in FIG. 3A.
Figure 4C:
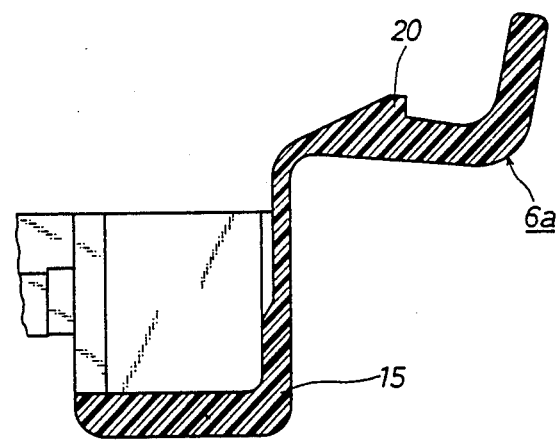
FIG. 4C is a partial sectional view along IVC—IVC in FIG. 3A.
Figure 4D:
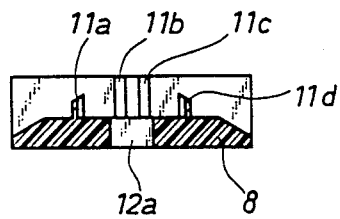
FIG. 4D is a sectional view along IVD—IVD in FIG. 3C.
Figure 4E:
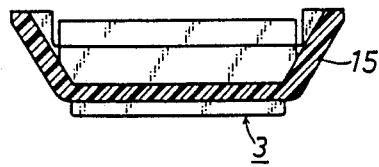
FIG. 4E is a sectional view along IVE—IVE in FIG. 3C.
Figure 4F:
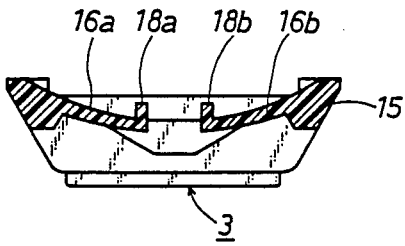
FIG. 4F is a sectional view along IVF—IVF in FIG. 3C.
Figure 4G:
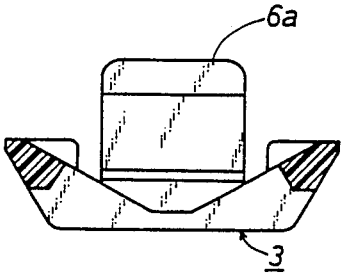
FIG. 4G is a sectional view along IVG—IVG in FIG. 3C.
Figure 5:
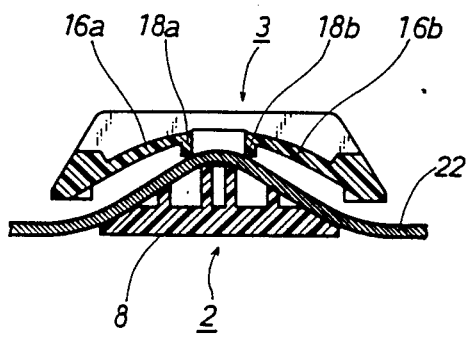
FIG. 5 is a sectional view of the closed strip clamp securing a strip.

As shown in FIG. 4C, the latch 6a has a latch hook 20 for locking under another hook 9, shown in FIG. 4A, in the slot 6b in the base frame 8. The latch 6a forms a single piece with the top frame 15. In practice, the strip clamp 1 is mounted on a mounting surface by driving screws through the holes 12a and 12b. As shown in FIG. 5, a strip 22 is placed on the ribs 11a, 11b, 11c and 11d of the base plate 2. The top plate 3 is pivoted on the hinges 4a and 4b until it locks onto the base plate, thus securing the strip. The latch 6a locks into the slot 6b. Tips 18a and 18b at the free ends of the flaps 16a and 16b press the strip 22 against the ribs 11a, 11b, 11c and 11d on the base plate 2. The inner ribs 11b and 11c are higher than the outside ribs 11a and 11d to better secure the strip 22 against the tips 18a and 18b. The strip clamp 1 bends the strip 22 and holds it in place.

The top plate 3 secures the strip 22 against the base plate 2 so the strip 22 cannot slip in the strip clamp 1. To open the strip clamp 1, simply push the latch 6a to disengage the latch hook 20 from the slot 6b, and lift the top plate 3. Since little force is applied to the base frame 8, a strip clamp 1 attached to a mounting surface using adhesives is less likely to be torn loose.

Figure 6A:
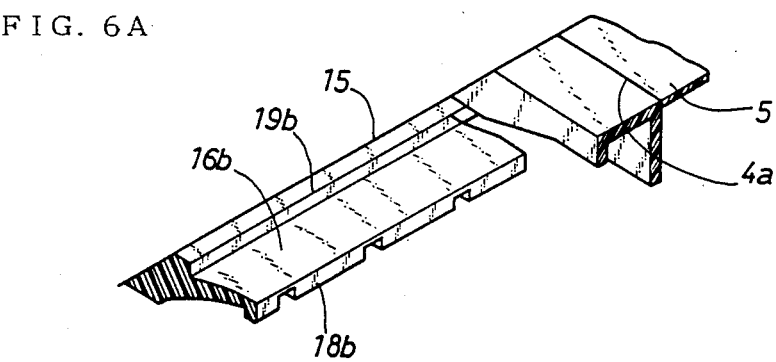
FIG. 6A is a partial sectional view of another embodiment.
Figure 6B:
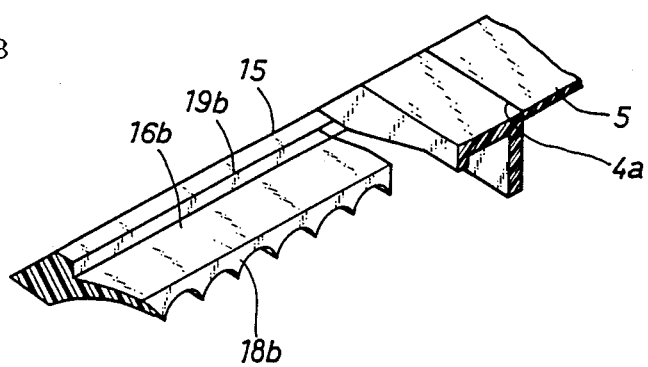
FIG. 6B is a partial sectional view of another embodiment.

The basic strip clamp, described above, may be modified as shown in FIGS. 6A and 6B. In FIG. 6A, the flap 16b (of course 16a as well) has tips 18b at intervals. In FIG. 6B, the tips 18b conform to the surface of a common kind of flat cable (not shown). This latter design prevents lateral movement of the cable.

These are only some of the possible embodiments of the invention claimed below. These embodiments are only illustrative of the invention, and in no way restrict the scope of the claims.

We claim:

1. A strip clamp for securing a strip comprising,
   a base plate,
   a top plate that overlaps and locks into the base plate, the top plate including means for defining a frame,
   resilient flaps projecting inwardly from the frame toward a central portion of the top plate, and
   tips on the flaps projecting toward the base plate.
2. A strip clamp as in claim 1, including a plurality of ribs on the base plate extending parallel to and on each side of the tips of the flaps.
3. A strip clamp as in claim 2, wherein the tips on the flaps are spaced apart at regular intervals.
4. A strip clamp as in claim 2, wherein the tips on the flaps conform to the shape of a surface of the strip to be held in the clamp.
5. A strip clamp as in claim 2, wherein each flap has a single tip that extends along the length of that flap.
6. A strip clamp as in claim 2 wherein the base plate and the top plate are joined by a joint with at least two hinges.
7. A strip clamp as in claim 2 wherein the ribs increase in height toward a central axis of the base plate parallel to the ribs.
8. A strip clamp comprising,
   a base member defining means for receiving a strip,
   means on the base member to provide for securing the base member to a support,
   a top member,
   means for securing the top member on the base member with the top member overlaying the base member, and
   the top member including two opposed resiliently yieldable flaps, each extending inwardly toward an open portion of the top member from respective opposed lateral edges of the top member.
9. A strip clamp as in claim 8 wherein the base member includes an upstanding rib extending across a portion of the base member and located in underlaying relationship to the open portion of the top member when the top member overlays the base member.
10. A strip claim as in claim 8 wherein the base member includes a pair of upstanding ribs extending across a portion of the base member which underlays the open portion of the top member when the top member is secured in overlaying relationships to the base member.
11. A clamp as in claim 10 wherein each flap includes a tip disposed along a free edge thereof and extending toward the base member.
12. A clamp as in claim 10 wherein the base member includes a second pair of ribs extending across a portion of the base member in substantially parallel and flanking relation to the first ribs, the first pair of ribs being of greater height than the second pair of ribs.
13. A clamp as in claim 8 wherein the means for securing the top member to the base member comprises a joint member extending between a bottom edge of the base member and a top edge of the top member, means for hinging the joint member to the bottom edge of the base member, and means for hinging the joint member to the top edge of the top member.
14. A clamp as in claim 13 wherein the securing means further comprises means for releasably locking the top member on the base member at a location opposite to the joint member.

* * * * *